United States Patent
Stineman, Jr. et al.

(10) Patent No.: US 7,856,561 B2
(45) Date of Patent: Dec. 21, 2010

(54) DETECTING LEGACY POWERED DEVICE IN POWER OVER ETHERNET SYSTEM

(75) Inventors: John Arthur Stineman, Jr., Carpinteria, CA (US); Jeffrey Lynn Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 715 days.

(21) Appl. No.: 11/252,607

(22) Filed: Oct. 19, 2005

(65) Prior Publication Data

US 2006/0168458 A1 Jul. 27, 2006

Related U.S. Application Data

(60) Provisional application No. 60/646,509, filed on Jan. 25, 2005.

(51) Int. Cl.
*G06F 1/00* (2006.01)
*G06F 15/177* (2006.01)
*G01R 27/00* (2006.01)
*G01R 27/02* (2006.01)

(52) U.S. Cl. .............. 713/300; 709/220; 324/600; 324/607

(58) Field of Classification Search ............ 719/220; 324/607, 600; 713/300
See application file for complete search history.

(56) References Cited

U.S. PATENT DOCUMENTS

| | | | |
|---|---|---|---|
| 6,275,047 B1 * | 8/2001 | Zoellick et al. | 324/678 |
| 6,459,275 B1 * | 10/2002 | Ewalt et al. | 324/539 |
| 6,597,183 B1 * | 7/2003 | Male | 324/607 |
| 6,973,394 B2 | 12/2005 | Jaeger et al. | |
| 7,154,381 B2 * | 12/2006 | Lang et al. | 340/310.11 |
| 7,248,097 B2 * | 7/2007 | Montgomery | 327/538 |
| 7,356,588 B2 * | 4/2008 | Stineman et al. | 709/224 |
| 7,366,297 B1 * | 4/2008 | Marshall et al. | 379/413.03 |

(Continued)

FOREIGN PATENT DOCUMENTS

CN 1364026 A 8/2002

(Continued)

OTHER PUBLICATIONS

Maxim Integrated Products, IEEE 802.3 af PD interface controller For Power-Over-Ethernet, 19-2991. Rev 0, Oct. 2003.*

(Continued)

*Primary Examiner*—Vincent T Tran
(74) *Attorney, Agent, or Firm*—McDermott Will & Emery LLP

(57) ABSTRACT

Novel system and methodology for detecting a Powered Device (PD) in a Power over Ethernet (PoE) system. A PD probing circuit generates a detection signal supplied to the PD and determines a PD response signal produced in response to the detection signal. Based on the PD response signal, the control circuit determines a detection value for identifying the PD. In particular, the control circuit concludes that the PD is a device satisfying a PoE standard if the detection value is in a first predetermined range, and concludes that the PD is a legacy PD device if the detection value is in a second predetermined range outside of the first predetermined range.

8 Claims, 3 Drawing Sheets

U.S. PATENT DOCUMENTS

| | | | |
|---|---|---|---|
| 2002/0091951 A1 | 7/2002 | Jaeger et al. | |
| 2002/0191553 A1 | 12/2002 | Lehr et al. | |
| 2003/0099076 A1* | 5/2003 | Elkayam et al. | 361/90 |
| 2004/0164619 A1* | 8/2004 | Parker et al. | 307/80 |
| 2004/0212423 A1 | 10/2004 | Inagaki | |
| 2004/0260794 A1* | 12/2004 | Ferentz et al. | 709/220 |
| 2006/0092000 A1* | 5/2006 | Karam et al. | 340/310.11 |
| 2006/0291405 A1* | 12/2006 | Karam | 370/284 |
| 2007/0025452 A1* | 2/2007 | Schindler | 375/257 |

FOREIGN PATENT DOCUMENTS

| | | |
|---|---|---|
| CN | 1157022 C | 7/2004 |
| CN | 1540858 A | 10/2004 |
| FR | 2 811 178 A | 1/2002 |
| JP | 2002-223210 | 8/2002 |

OTHER PUBLICATIONS 802.3af "IEEE standard for information teachnology—Telecommuniations and information exchange between systems-local and metropolitan area networks" Jun. 18, 2003 IEEE Computer Society.*

Avaya P333T-PWR "Power over Ethernet Stackable Switch" May 2002 Software Version 3.12.*

ES3000 Ethernet Switch User Guide, Symbol The Enterprise Mobility Company, 72E-68446-01 Revision A May 2004.*

"Power over Ethernet: Cisco Inline Power and IEEE 802.3af," [Online] 2004, Cisco Systems, pp. 1-13.

"IEEE Std 802.3af-2003," IEEE, [Online] Jun. 18, 2003, New York, USA, pp. I-X and 1-121.

Chinese Office Action, with English translation, issued in Chinese Patent Application No. CN 2006800093508, mailed Feb. 6, 2009.

Part 3: Carrier Sense Multiple Access with Collision Detection (CSMA/CD) Access Method and Physical Layer Specification Amendment: Data Terminal Equipment (DTE) Power via Media Department Interface (MDI), IEEE Std 802.3af-2003, Jun. 18, 2003, The Institute of Electrical and Electronics Engineers, Inc., New York NY USA.

Chinese Office Action issued in Chinese Patent Application No. 200680005472X dated Nov. 7, 2008.

Chinese Office Action issued in Chinese Patent Application No. 2006800031997 dated Nov. 7, 2008.

Chinese Office Action issued in Chinese Patent Application No. 2006800031925 dated Nov. 7, 2008.

Partial English translation of J. Israelsohn, "PoE is emerging, A wide variety of controller ICs are now available," EDN Japan January issue od 2004, Reed Business Information Japan, Feb. 13, 2004, <http://web.archive.org/web/20040213135555/http://www.ednjapan.com/content/issue/2004/01/feature02.html>.

English translation of Japanese Notice of Grounds of Rejection issued in Japanese Patent Application No. JP 2007-552157 dated Jun. 8, 2010.

* cited by examiner

DETECTING LEGACY POWERED DEVICE IN POWER OVER ETHERNET SYSTEM

This application claims priority of provisional U.S. patent application Ser. No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for detection of a Legacy Powered Device (PD) in a Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from Power Sourcing Equipment (PSE) to a Powered Device (PD) located at opposite sides of a link. Traditionally, network devices such as IP phones, wireless LAN access points, personal computers and Web cameras, have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

PSE's main functions are to search the link for a PD requesting power, optionally classify the PD, supply power to the link if a PD is detected, monitor the power on the link, and disconnect power when it is no longer requested or required. A PD participates in the PD detection procedure by presenting PoE detection signature defined by the IEEE 802.3af standard. The PD detection signature has electrical characteristics measured by the PSE, such as a signature resistance in a range from 19 to 26.5 KΩ.

However, some PDs manufactured before the ratification of the IEEE 802.3af standard do not have the IEEE 802.3af standard detection signature. These PDs are referred to as legacy PDs. For example, some legacy PDs may have a large capacitor and at least one series diode as their PoE detection signature. Other legacy PDs may use a data loopback for its PoE detection signature. This data loopback involves a smaller capacitor between the wire pairs that is not directly used for PD detection.

Although it may be desirable to supply power to the legacy PDs, they will not be detected during a regular PD detection procedure. Therefore, there is a need for a PD detection scheme that would support detection of the legacy PDs.

SUMMARY OF THE DISCLOSURE

The present disclosure offers novel system and methodology for detecting a Powered Device (PD) in a Power over Ethernet (PoE) system. A PD probing circuit generates a detection signal supplied to the PD and determines a PD response signal produced in response to the detection signal. Based on the PD response signal, the control circuit determines a detection value for identifying the PD. In particular, the control circuit concludes that the PD is a device satisfying a PoE standard if the detection value is in a first predetermined range, and concludes that the PD is a legacy PD device if the detection value is in a second predetermined range outside of the first predetermined range.

In accordance with one aspect of the disclosure, the control circuit may compare the detection value with a predetermined threshold value to determine whether or not the PD is a legacy device. For example, the PD may be identified as a legacy device if the detection value is negative or less than the predetermined threshold value, which may be less than the minimum value of the first predetermined range.

In accordance with an embodiment of the disclosure, the detection value may include a detection resistance value. The control circuit may determine that the PD is the legacy PD device if the detection resistance value is negative or less than a threshold resistance value. The threshold resistance value may be less than the minimum acceptable value of the signature resistance defined in the IEEE 802.3af standard.

The PD probing circuit may produce a first detection current followed by a second detection current smaller than the first detection current. The control circuit may detect the legacy PD device if first response voltage produced in response to the first current is smaller than second response voltage produced in response to the second current.

Also, the control circuit may detect the legacy PD device if the first response voltage is larger than the second response voltage, but a difference between these voltages is less than a pre-set threshold value.

For example, the control circuit may detect the legacy device when a detection resistance value defined by a difference between the first response voltage the second response voltage is negative or less than a predetermined threshold resistance value, which may be less than the minimum signature resistance value defined by the PoE standard.

In accordance with a method of the present disclosure, the following steps are carried out for detecting a PD in a PoE system:

producing a detection signal supplied to the PD to determine a PD response signal, and based on the PD response signal, determining that the PD is a device satisfying a PoE standard if the detection value is in a first predetermined range, and determining that the PD is a legacy PD device if the detection value is in a second predetermined range outside of the first range.

The step of producing a detection signal may include producing a first detection signal followed by a second detection signal having a smaller value than the first detection signal. The legacy device is detected when a detection resistance value defined by a difference between a first response signal produced in response to the first detection signal, and a second response signal produced in response to the second detection signal is negative or less than a threshold resistance value.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made with the example of detecting a legacy PD in a PoE system. It will become apparent, however, that the concepts described herein are applicable to recognizing any connectable device provided with power in a power supply system.

Figure 1:
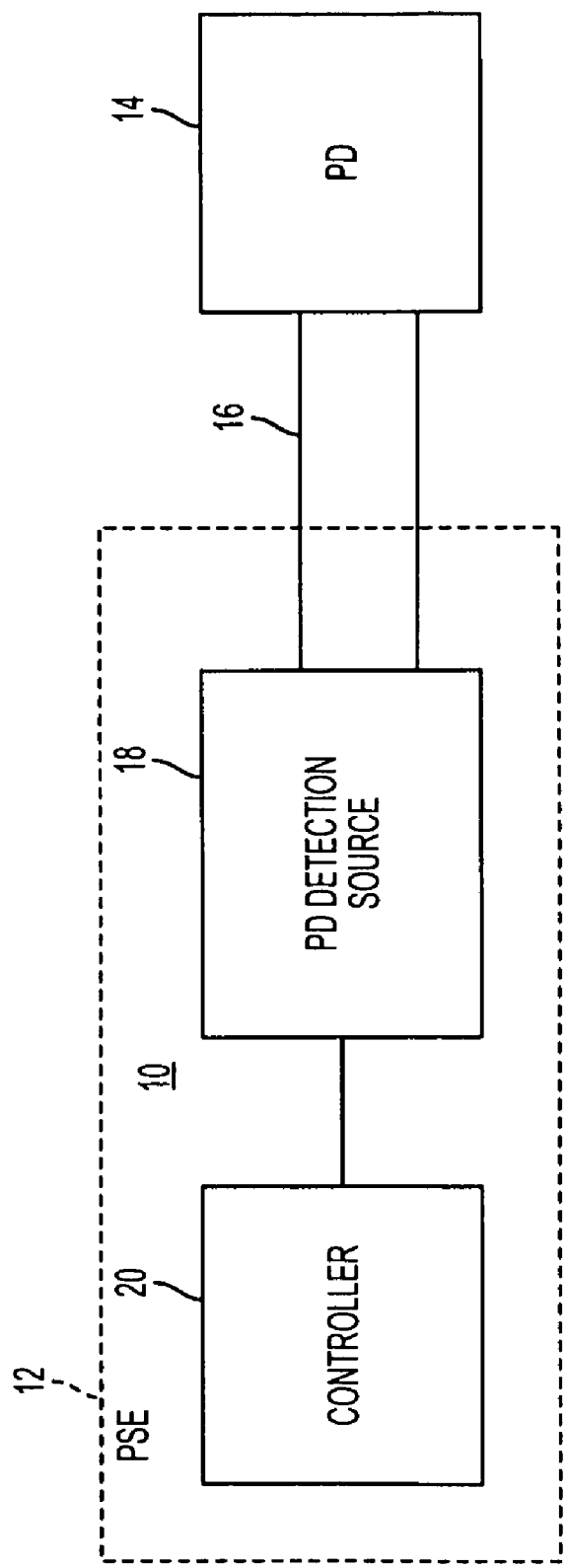
FIG. 1 is a block diagram illustrating an exemplary system for detecting a PD in accordance with the present disclosure.

FIG. 1 shows a simplified block-diagram of a PD detection system 10 of the present disclosure in a PoE system comprising a PSE 12, and a PD 14 connectable to the PSE 12 via a link 16, such as a 2-wire link defined in the IEEE 802.3af standard. The PD detection system 10 includes a detection source 18 and a controller 20 that may be arranged in the PSE 12.

The detection source 18 may be a force-current detection source that produces detection current Idet supplied to the PD 14 and determines voltage Vres produced in response to the detection current. The controller 20 may be a state machine or a microcontroller arranged in the PSE 12.

Figure 2:
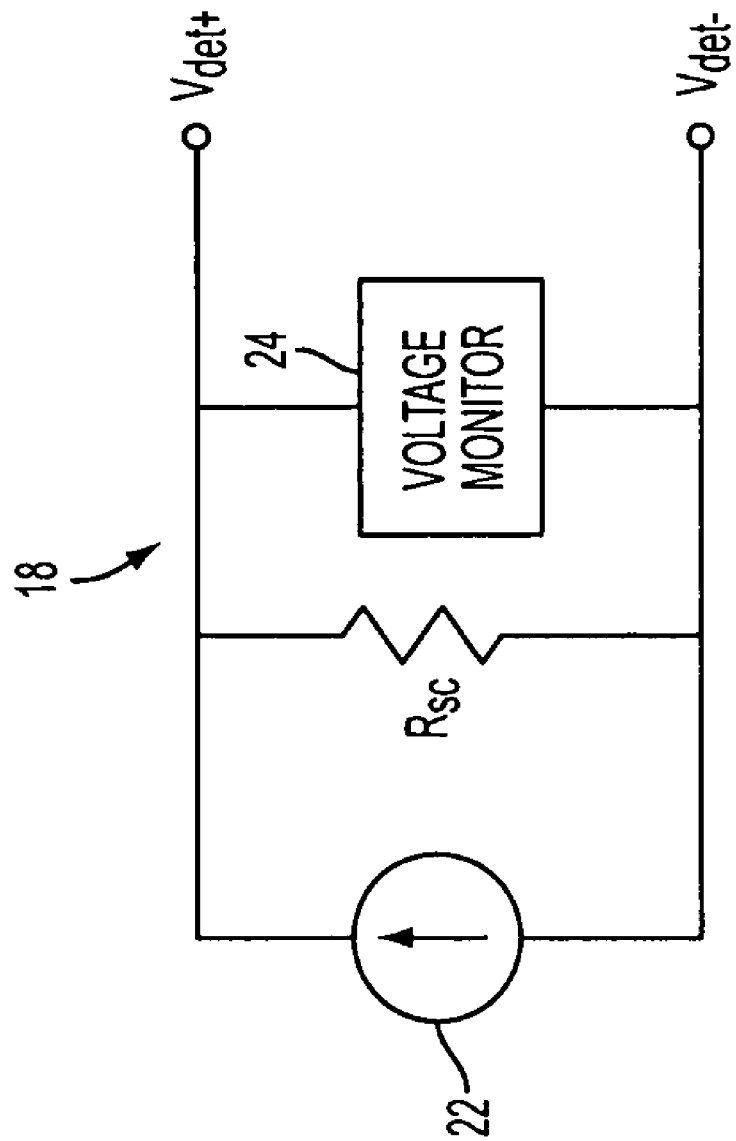
FIG. 2 is a Norton equivalent circuit of a detection source.

FIG. 2 shows a Norton equivalent circuit of the detection source 18 that comprises a current source 22, source resistance Rsc connected in parallel to the current source 22, and a voltage monitor 24 connected in parallel to the source resistance Rsc.

In each test for detecting the PD 14, the detection source 18 produces detection current Idet that may correspond to detection voltage Vdet in the voltage range from 2.8V to 10V defined in the IEEE 802.3af standard. The source resistance Rsc may be in the range from 100 KOhm to 100 MOhm. The minimum current difference between values of the detection current Idet produced for different detection tests corresponds to a Vdet voltage difference of 1V.

The voltage monitor 24 determines voltage Vres produced in response to the detection current Idet supplied to the PD 14. The detection resistance Rdet of the PD 14 is determined as $Rdet = \Delta Vres/\Delta Idet$, where ΔIdet is a difference between detection currents in different tests, and ΔVres is a difference between voltages produced in response to the respective detection currents.

Figure 3:
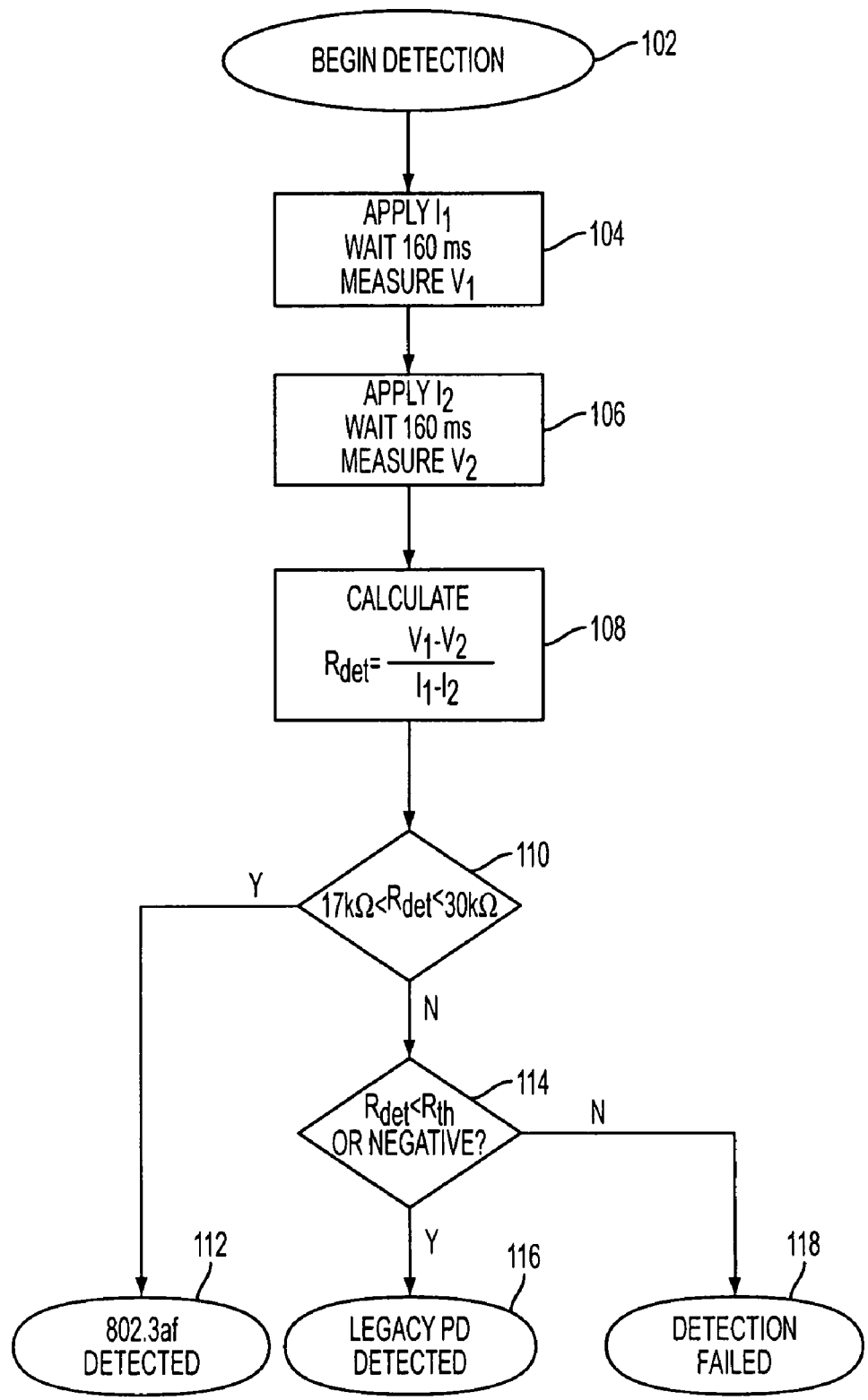
FIG. 3 is a flow chart illustrating a control algorithm for controlling operations of the system for detecting a legacy PD.

FIG. 3 is a flow chart illustrating a control algorithm carried out by the controller 24 to enable the PD detection system 10 to detect a legacy PD, which may be a PD that does not have a detection signature required by the IEEE 802.3af standard. For example, some legacy PDs may have a large capacitor and at least one series diode as their PoE detection signature. Other legacy PDs may use a data loopback for its PoE detection signature. This data loopback involves a smaller capacitor between the wire pairs that is not directly used for PD detection.

After a PD detection procedure is initiated (step 102), the controller 20 requests the detection source 18 to generate detection current $I_1$. For example, the 240 mA current may be produced. After a pre-set waiting period equal for example to 160 ms, the detection source 18 is controlled to enable the voltage monitor 24 to measure voltage $V_1$ developed in response to the current $I_1$ supplied to the PD 14 (step 104).

Thereafter, the controller 20 requests the detection source 18 to generate detection current $I_2$ smaller then the current $I_1$. For example, the current $I_2$ may be equal to 180 mA. After a pre-set waiting period equal for example to 160 ms, the voltage monitor 24 is requested to measure voltage $V_2$ developed in response to the current $I_2$ supplied to the PD 14 (step 106).

Based on the measured response voltages. $V_1$ and $V_2$, the controller 20 in step 108 calculates detection resistance Rdet of the PD 14 as follows:

$Rdet = (V_1 - V_2)/(I_1 - I_2)$, and determines whether the calculated detection resistance Rdet is within a range acceptable for the IEEE 802.3af standard, for example from 17KΩ to 30KΩ (step 110). If so, the controller 20 concludes that the PD 14 is a device compliant with the IEEE 802.3af standard (step 112).

If the calculated detection resistance Rdet is outside of the range acceptable for the IEEE 802.3af standard, the controller 20 determines whether the PD 14 is a legacy device that may be powered by the PSE 12. For example, if the PD 14 is a legacy device having a large capacitor (for example more than 47 μF) and a diode coupled in series to the capacitor, the second measured voltage $V_2$ will be larger than the voltage $V_1$ as a result of the charging of the large capacitor. If the capacitor is very large, the two measured voltages $V_1$ and $V_2$ will have nearly the same value. A difference between these voltages will be limited to an offset voltage caused by the forward drop across the series diode.

If the PD 14 is a legacy device having a smaller capacitor (for example in the range from 1 μF to 33 μF) and a resistor coupled in parallel to the capacitor, the second measured voltage $V_2$ may or may not be larger than the voltage $V_1$ depending on the size of the capacitor, the value of the resistor, values of produced detection currents $I_1$ and $I_2$, and the period of time between measurements of the voltages $V_1$ and $V_2$. However, the connected PD 14 may be identified as a legacy device using a difference between voltages $V_1$ and $V_2$ caused by an offset voltage produced by the combination of the capacitor and the parallel resistor as the capacitor charges up.

Hence, if the second measured voltage $V_2$ produced in response to the second detection current $I_2$ smaller than the first detection current $I_1$, is greater than the first measured voltage $V_1$, the controller 20 may conclude that the connected PD 14 is a legacy device.

Further, if the voltage $V_1$ is greater than the voltage $V_2$, the controller 20 may compare a difference between these voltages with a pre-selected threshold voltage corresponding to the offset voltage produced in response to successive supplying detection currents $I_1$ and $I_2$. If the difference between voltages $V_1$ and $V_2$ is less than the threshold voltage, the controller 20 may conclude that the connected PD 14 is a legacy device.

In accordance with an embodiment of the present disclosure, if the detection resistance Rdet calculated in step 108 is outside of the range acceptable for the IEEE 802.3af standard, the controller 20 compares the detection resistance with a threshold resistance Rth corresponding to the threshold voltage pre-selected to detect legacy powered devices that may be connected to the PSE 12 (step 114). For example, the threshold resistance Rth may be equal to 6KΩ.

If the detection resistance Rdet is less than the threshold resistance Rth, or negative (indicating that the voltage $V_2$ is greater than the voltage $V_1$), the controller 20 concludes that the connected PD 14 is a legacy device that may be powered by the PSE 12 (step 116). If the detection resistance Rdet is not negative or less than the threshold resistance Rth, the controller 20 determines that the connected device is neither a PD compliant with the IEEE 802.3af standard nor a legacy PD that may be powered by the PSE 12 (step 118).

Hence, in addition to a first detection resistance range acceptable for the IEEE 802.3af standard, the controller 20 checks a second detection resistance range pre-selected to detect a legacy device that may be connected to the PSE 12. As discussed above, the second detection range may cover, for example, negative values of the detection resistance or values, which are less than a predetermined threshold resistance. If the detection resistance Rdet of the connected PD 14 is within the second range, the connected PD 14 is considered to be a legacy device. As a result, the PSE 12 is capable of detecting not only a powered device compliant with the IEEE 802.3af standard, but also a legacy device that may need to be powered.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for providing power to a powered device (PD) in a Power over Ethernet (PoE) system, comprising:
   a PD probing circuit for supplying the PD with a first detection current followed by a second detection current smaller than the first detection current, and determining a first response voltage developed in response to the first detection current, and a second response voltage developed in response to the second detection current, and
   a control circuit for detecting a legacy PD that uses capacitance as a detection signature, the control circuit detecting the legacy PD when a detection resistance value defined by a difference between the first response voltage and the second response voltage, is less than a pre-defined minimum resistance value or negative,
   the legacy PD being a device that could be powered by a power supply device in the PoE system.

2. The system of claim 1, wherein the control circuit is configured:
   to determine whether or not the PD is a device satisfying a requirement of the PoE system, and
   if the PD is not the device satisfying a requirement of the PoE system, to determine whether or not the PD is the legacy PD.

3. The system of claim 1, wherein the pre-defined minimum resistance value is less than a minimum signature resistance value defined by a requirement of the PoE system.

4. A method of providing power to a powered device (PD) in a Power over Ethernet (PoE) system, comprising the steps of:
   producing a first detection signal supplied to the PD and followed by a second detection signal having a smaller value than the first detection signal to determine a first response signal produced in response to the first detection signal, and a second response signal produced in response to the first detection signal, and
   based on a detection resistance value defined by a difference between the first response signal and the second response signal, determining that the PD is a device satisfying a requirement of the PoE system if the detection value is in a first predetermined range,
   if the detection resistance value is outside of the first predetermined range, based on the detection resistance value, determining whether or not the PD is a legacy device that uses capacitance as a detection signature,
   the PD being considered to be the legacy device when the detection resistance value is less than a pre-defined minimum resistance value or negative,
   the PD being a device that could be powered by a power supply device in the PoE system.

5. The method of claim 4, wherein the pre-defined minimum resistance value is less than a minimum signature resistance value defined by the requirement of the PoE system.

6. A Power Sourcing Equipment (PSE) in a Power over Ethernet (PoE) system, comprising:
   a powered device (PD) detection source for producing first detection current supplied to the PD to determine first response voltage, and for producing second detection current smaller than the first detection current to determine second response voltage, and
   a detecting circuit for detecting a legacy PD that uses capacitance as a detection signature, the detection circuit determining that the PD is the legacy PD when a detection resistance value defined by a result of subtracting a value of the second response voltage from a value of the first response voltage, is less than a pre-defined minimum resistance value or negative,
   the legacy PD being a device that could be powered by the PSE in the PoE system.

7. The PSE of claim 6, wherein the detecting circuit is further configured to detect a PD that satisfies a requirement of the PoE system, when the detection resistance value is within a required signature resistance range.

8. The PSE of claim 6, wherein the pre-defined minimum resistance value is smaller than a minimum signature resistance value defined by a requirement of the PoE system.

* * * * *